United States Patent
Scanlon et al.

(10) Patent No.: US 11,415,166 B2
(45) Date of Patent: Aug. 16, 2022

(54) DUAL INSTALL SUCTION MOUNTING ASSEMBLIES

(71) Applicant: Decolin Inc., Montreal (CA)

(72) Inventors: Benjamin Scanlon, Philadelphia, PA (US); Jay R. Dickerscheid, Lowell, AR (US); David M. Baines, Bedford, NY (US); Frank Coratolo, Blackwood, NJ (US)

(73) Assignee: Decolin Inc., Montreal (CA)

( * ) Notice: Subject to any disclaimer, the term of this patent is extended or adjusted under 35 U.S.C. 154(b) by 0 days.

(21) Appl. No.: 16/936,838

(22) Filed: Jul. 23, 2020

(65) Prior Publication Data

US 2021/0025440 A1      Jan. 28, 2021

Related U.S. Application Data

(60) Provisional application No. 62/878,082, filed on Jul. 24, 2019.

(51) Int. Cl.
*F16B 47/00* (2006.01)
*A47G 29/087* (2006.01)

(52) U.S. Cl.
CPC ............ *F16B 47/00* (2013.01); *A47G 29/087* (2013.01); *A47K 2201/02* (2013.01)

(58) Field of Classification Search
CPC ...... F16B 47/00; F16B 47/003; A47G 29/087; A47G 1/17; A47K 2201/02; A47K 5/00
USPC ...... 248/467, 683, 537, 205.5, 205.8, 206.2, 248/206.3, 309.3, 362, 363
See application file for complete search history.

(56) References Cited

U.S. PATENT DOCUMENTS

| | | | | |
|---|---|---|---|---|
| 2,542,101 A | * | 2/1951 | Suben | B24B 13/005 248/205.8 |
| 4,133,575 A | * | 1/1979 | Mader | B60J 1/20 248/205.8 |
| 6,478,271 B1 | | 11/2002 | Mulholland | |
| 6,663,077 B2 | | 12/2003 | Zou | |
| 6,666,420 B1 | * | 12/2003 | Carnevali | F16B 47/00 248/205.8 |
| 6,932,306 B2 | * | 8/2005 | Zou | F16B 45/00 248/205.5 |
| 7,357,361 B2 | * | 4/2008 | Yen | F16M 11/2064 248/205.8 |
| 7,628,362 B2 | * | 12/2009 | Song | F16B 47/003 248/205.8 |
| 7,690,610 B2 | * | 4/2010 | Ristau | F16B 47/00 248/205.5 |
| 7,850,133 B2 | * | 12/2010 | Carnevali | F16B 47/00 248/205.8 |
| 8,123,181 B2 | | 2/2012 | Choi | |
| 2006/0289708 A1 | * | 12/2006 | Lin | B60R 11/00 248/160 |
| 2012/0112023 A1 | * | 5/2012 | Tollman | F16B 47/006 248/205.8 |

(Continued)

*Primary Examiner* — Muhammad Ijaz
(74) *Attorney, Agent, or Firm* — Alan G. Towner; Leech Tishman Fuscaldo & Lampl

(57) ABSTRACT

Dual install suction mounting assemblies that include suction pads and adhesive pads that are interchangeably installed in the same housing are disclosed. When the suction pad is installed, a handle is used to pull a suction disk from a flat position against a wall to a cupped position that holds the assembly tightly on the wall. When the adhesive pad is installed, a flat adhesive sheet secures the assembly to the wall.

24 Claims, 8 Drawing Sheets

(56) References Cited

U.S. PATENT DOCUMENTS

| | | | |
|---|---|---|---|
| 2013/0200237 A1* | 8/2013 | Park | A47G 1/17 |
| | | | 248/304 |
| 2014/0084118 A1* | 3/2014 | Tooley | F16B 11/00 |
| | | | 248/205.3 |
| 2014/0374553 A1* | 12/2014 | Park | F16B 47/00 |
| | | | 248/205.5 |
| 2016/0215813 A1 | 7/2016 | Huang et al. | |
| 2019/0315516 A1* | 10/2019 | Tapia | B65D 23/003 |
| 2021/0025440 A1* | 1/2021 | Scanlon | F16B 47/00 |

* cited by examiner

DUAL INSTALL SUCTION MOUNTING ASSEMBLIES

CROSS-REFERENCE TO RELATED APPLICATION

This application claims the benefit of U.S. Provisional Patent Application No. 62/878,082 filed Jul. 24, 2019, which is incorporated herein by reference.

FIELD OF THE INVENTION

The present invention relates to dual install suction mounting assemblies with interchangeable suction and adhesive pads.

BACKGROUND INFORMATION

Many bath accessories such as hooks, baskets, shower caddies, soap dishes and the like are currently held in place using suction cups. However, many bathroom walls do not offer a flat and smooth surface required for suction cups to adequately hold on the walls.

SUMMARY OF THE INVENTION

The present invention provides dual install suction mounting assemblies that include suction pads and adhesive pads that are interchangeably installed in the same housing. When the suction pad is installed, a handle is used to pull a suction disk from a flat position against a wall to a cupped position that holds the assembly tightly on the wall. When the adhesive pad is installed, a flat adhesive sheet secures the assembly to the wall.

An aspect of the present invention is to provide a suction mounting assembly comprising a housing, a handle adjacent to the housing comprising a central post, a suction pad comprising a suction disk engageable with the housing and a first support stem including a first central support post engageable with the central post of the handle, and an adhesive pad comprising an adhesive contact sheet engageable with the housing and a second support stem including a second central support post engageable with the central post of the handle, wherein the suction pad and adhesive pad are interchangeably mountable on the housing.

This and other aspects of the present invention will be more apparent from the following description.

DETAILED DESCRIPTION

The present invention provides consumers with a mounting assembly choice between using suction or a strong adhesive, utilizing the original suction cup casing. The consumer can selectively use a rubber type suction cup, or remove the rubber type suction cup and replace it with an adhesive pad that can be adhered to almost any surface.

Figure 1:
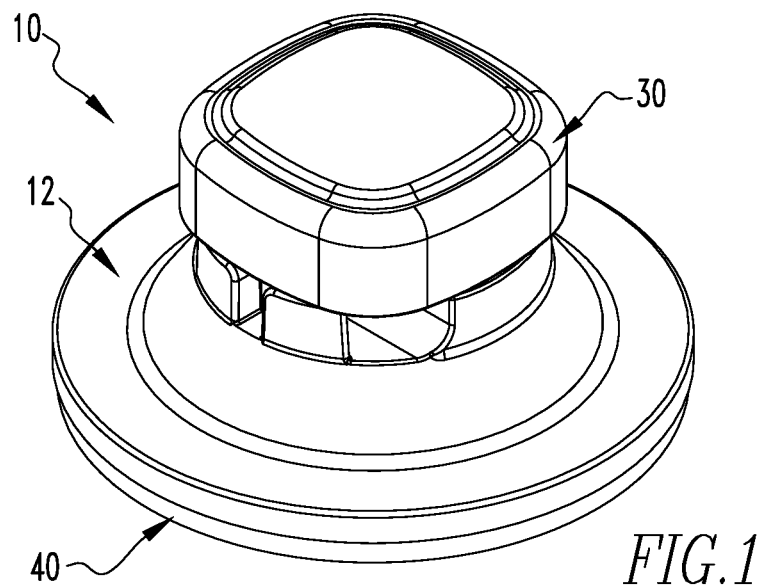
FIG. 1 is an isometric view of a mounting assembly of the present invention with an interchangeable suction pad installed.
Figure 2:
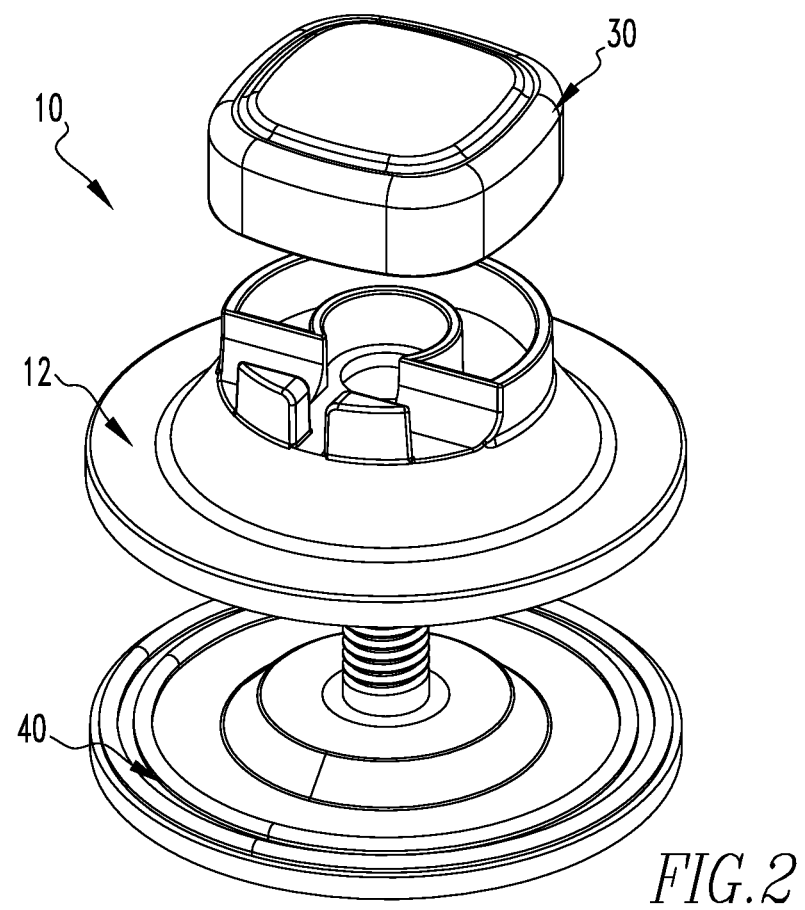
FIG. 2 is an exploded isometric view of the mounting assembly with suction pad shown in FIG. 1.

FIGS. 1 and 2 illustrate a mounting assembly 10 including a housing 12 and a handle 30. A suction pad 40 is removably installed on the mounting assembly 10. In the configuration shown in FIGS. 1 and 2, the mounting assembly 10 may be secured to a bathroom wall or other smooth, flat surfaces by means of the suction pad 40.

Figure 3:
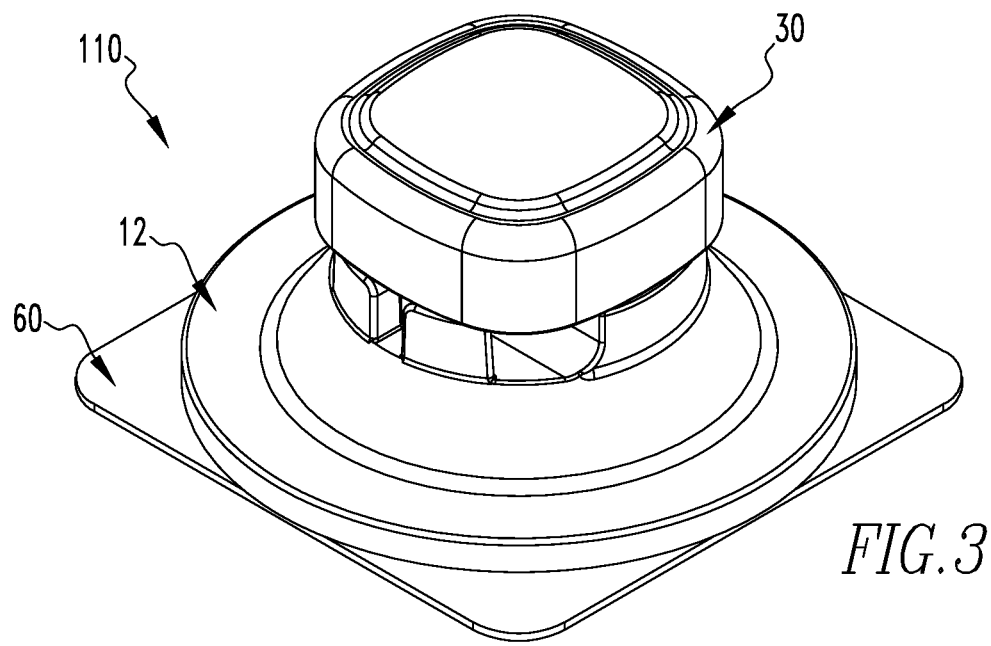
FIG. 3 is an isometric view of a mounting assembly of the present invention with an interchangeable adhesive pad installed.
Figure 4:
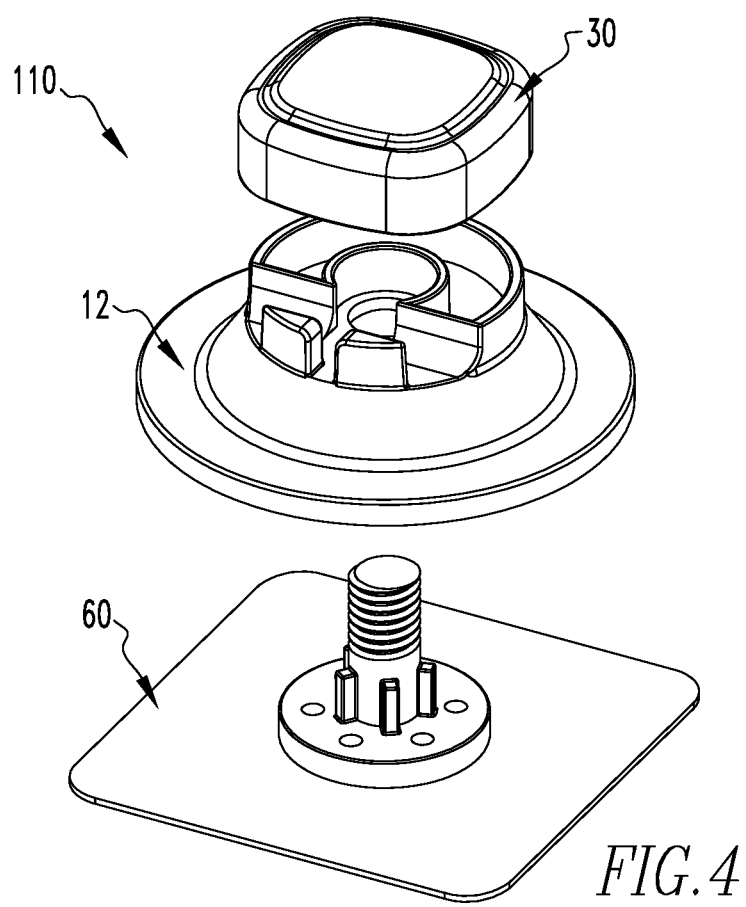
FIG. 4 is an exploded isometric view of the mounting assembly with adhesive pad shown in FIG. 3.
Figure 5:
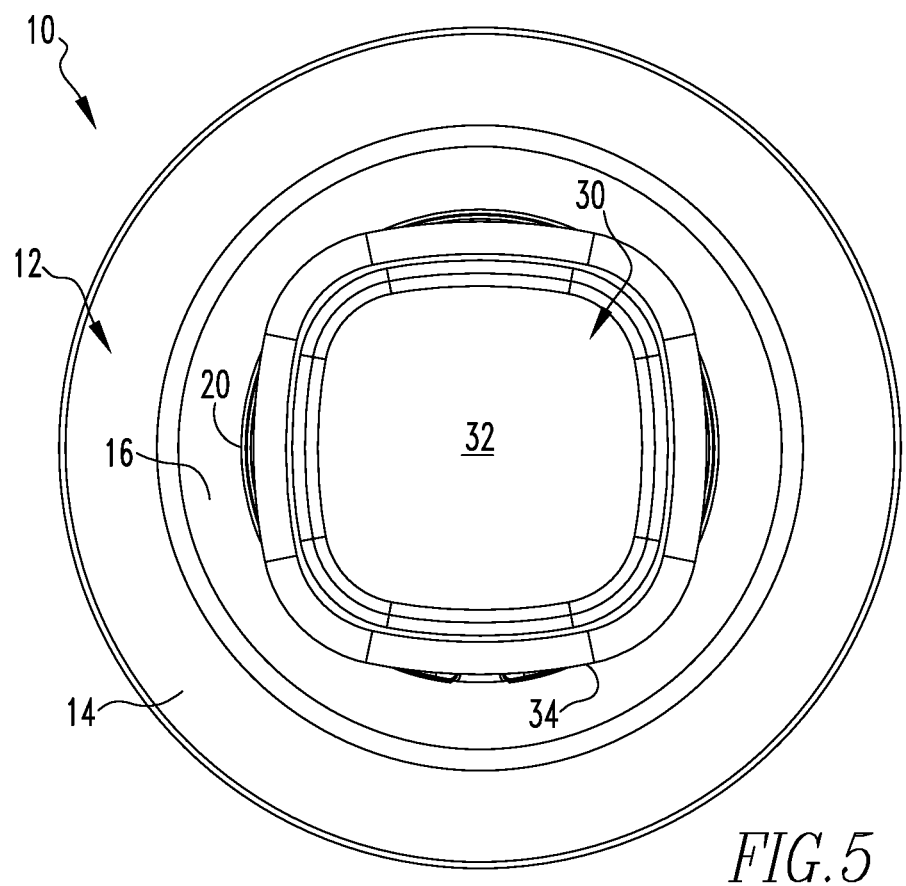
FIG. 5 is a top view of the suction pad mounting assembly shown in FIGS. 1 and 2.
Figure 6:
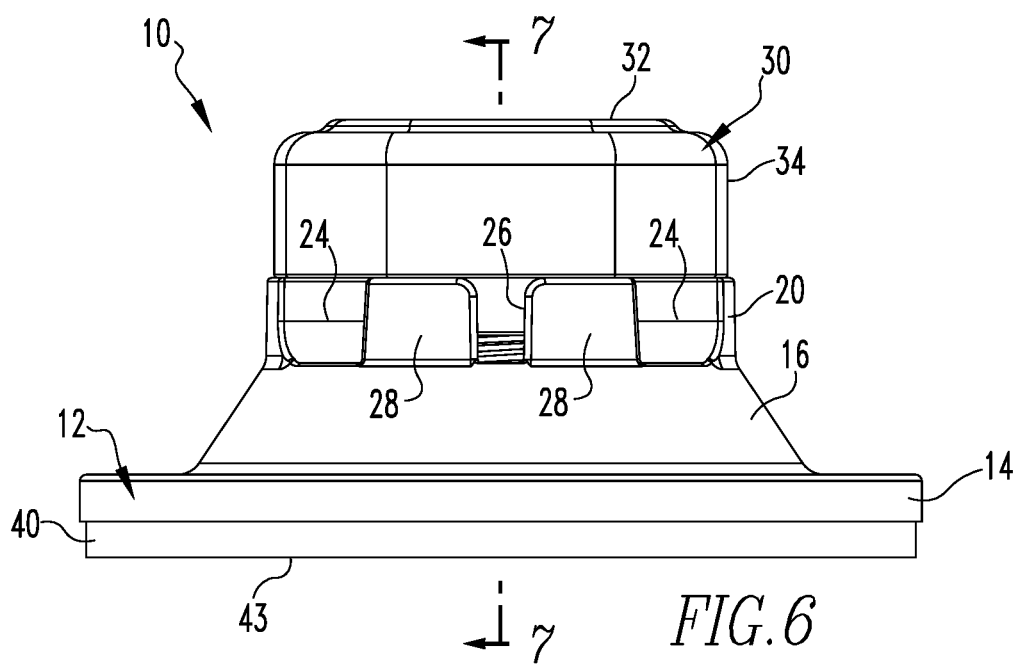
FIG. 6 is a side view of the suction pad mounting assembly shown in FIGS. 1 and 2.

FIGS. 3 and 4 illustrate an alternative configuration of a mounting assembly 110, which includes the same housing 12 and handle 30 of the configuration shown in FIGS. 1 and 2. The mounting assembly 110 includes a removably installed adhesive pad 60. In this configuration, the adhesive pad 60 may be used to secure the mounting assembly 110 on various types of bathroom walls and other surfaces that may not be smooth or flat enough for a suction pad to adequately hold the mounting assembly.

As shown in FIGS. 1-4, the same housing 12 and handle 30 are used for both the suction pad mounting assembly 10 and the adhesive pad mounting assembly 110. Accordingly, the same element numbers are used to describe the same structural features in both the configuration of FIGS. 1 and 2 and the configuration of FIGS. 3 and 4.

FIGS. 5-13 illustrate features of the suction pad mounting assembly 10 of FIGS. 1 and 2. The housing 12 includes a base flange 14, a conical sidewall 16 and a top wall 18. As described more fully below, the bottom surface of the base flange 14 includes concentric circular channels 15 that receive opposing concentric raised rings 45 of the suction pad 40. A central opening 19 is provided in the top wall 18 of the housing 12, as shown most clearly in FIGS. 9 and 10, as well as FIGS. 7 and 8.

The housing 12 includes a cylindrical central extension 20 having an outer cylindrical wall 21 and an inner cylindrical wall 22 forming a C-shaped channel 23 therebetween. A horizontal support channel 24 is provided in the cylindrical central extension 20 between the C-shaped channel and two support pillars 28. A vertical support channel 26 running between the support pillars intersects the horizontal support channel 24. The horizontal and vertical support channels 24 and 26 may be used to mount various types of bathroom accessories including hooks, shower caddies, soap dishes, and the like. The housing 12 may be made of any suitable material including plastics, metals and the like. For example, suitable plastics include polypropylene (PP), acrylonitrile butadiene styrene (ABS), high impact polystyrene (HIPS), nylon and the like.

As shown in FIGS. 5-8, the handle 30 is provided in the form of a knob including a front face 32 and sidewalls 34. The sidewalls 34 terminate in a contact edge 35 that engages the outer cylindrical wall 21 and the support pillars 28 of the cylindrical central extension 20. An interiorly threaded central post 36 is provided inside the handle 30. In the embodiment shown, the handle 30 has a generally square shape with rounded corners. However, any other suitable shape may be used. While the handle 30 may be provided as a rotatable knob, other embodiments of handles include levers, pull tabs and the like that can be manipulated by hand to pull a support stem 50 of the suction pad 40 inward into the housing 12 to form a suction cup, as more fully described below. The handle 30 may be made of any suitable material including plastics, metals and the like. For example, suitable plastics include PP, ABS, HIPS, nylon and the like.

Figure 7:
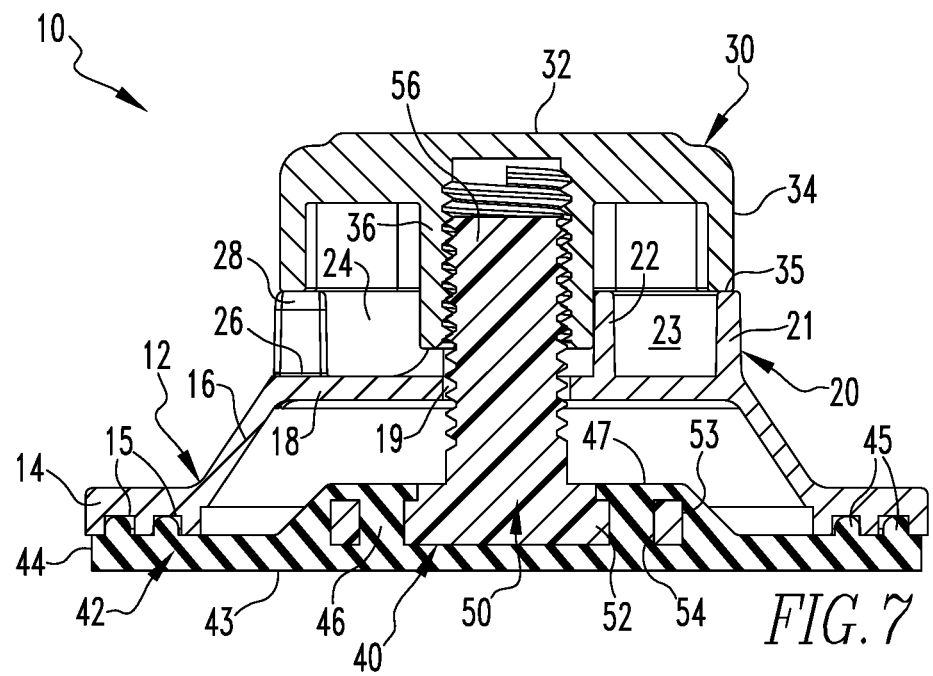
FIG. 7 is a side sectional view taken through line 7-7 of FIG. 6.
Figure 8:
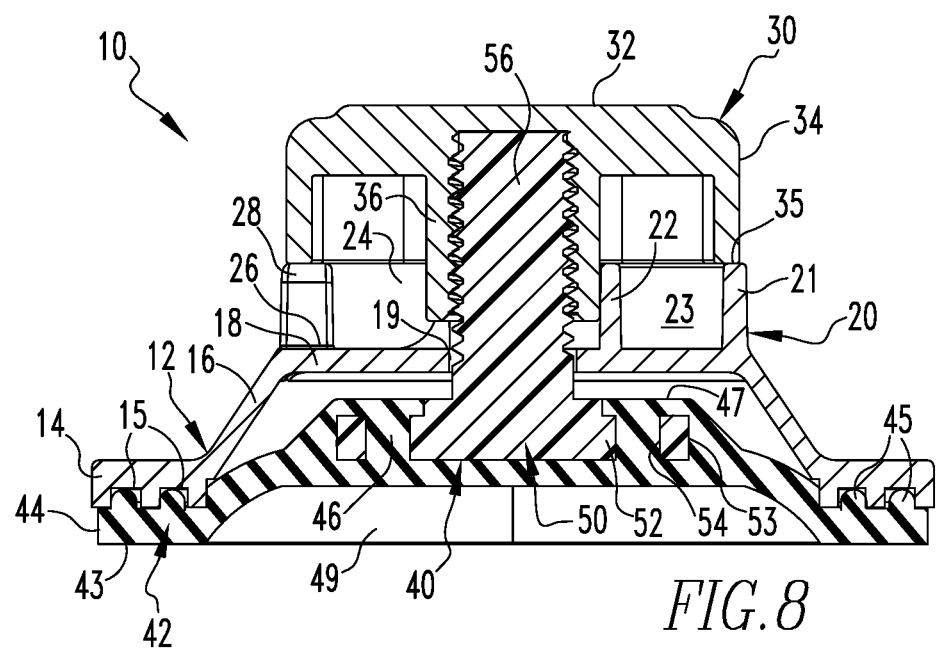
FIG. 8 is a side sectional view similar to that of FIG. 7, showing the suction pad drawn inwardly to form a recessed suction cup.
Figure 9:
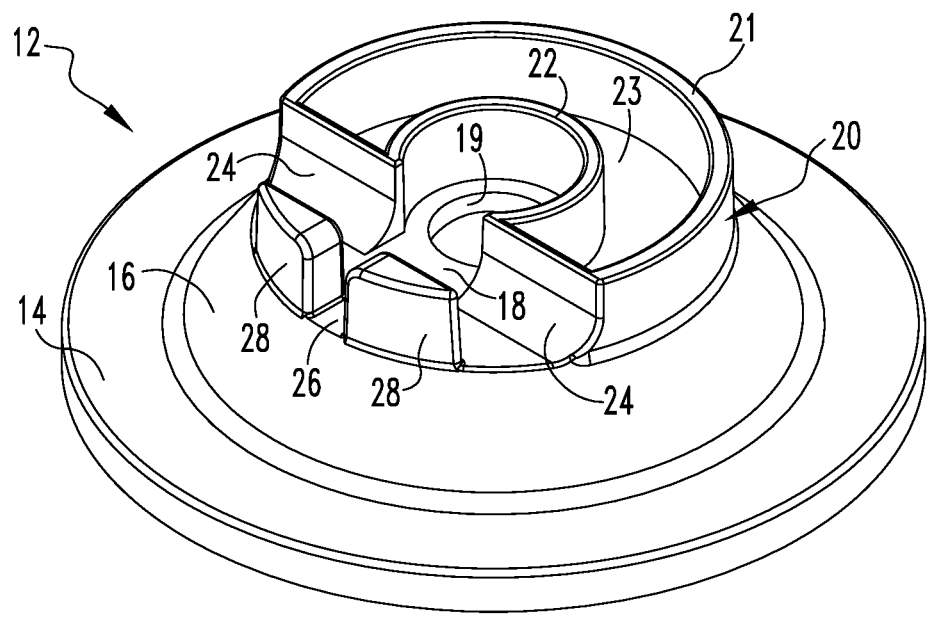
FIG. 9 is an isometric view and FIG. 10 is a bottom view of a housing of the mounting assemblies shown in FIGS. 1-4.
Figure 10:
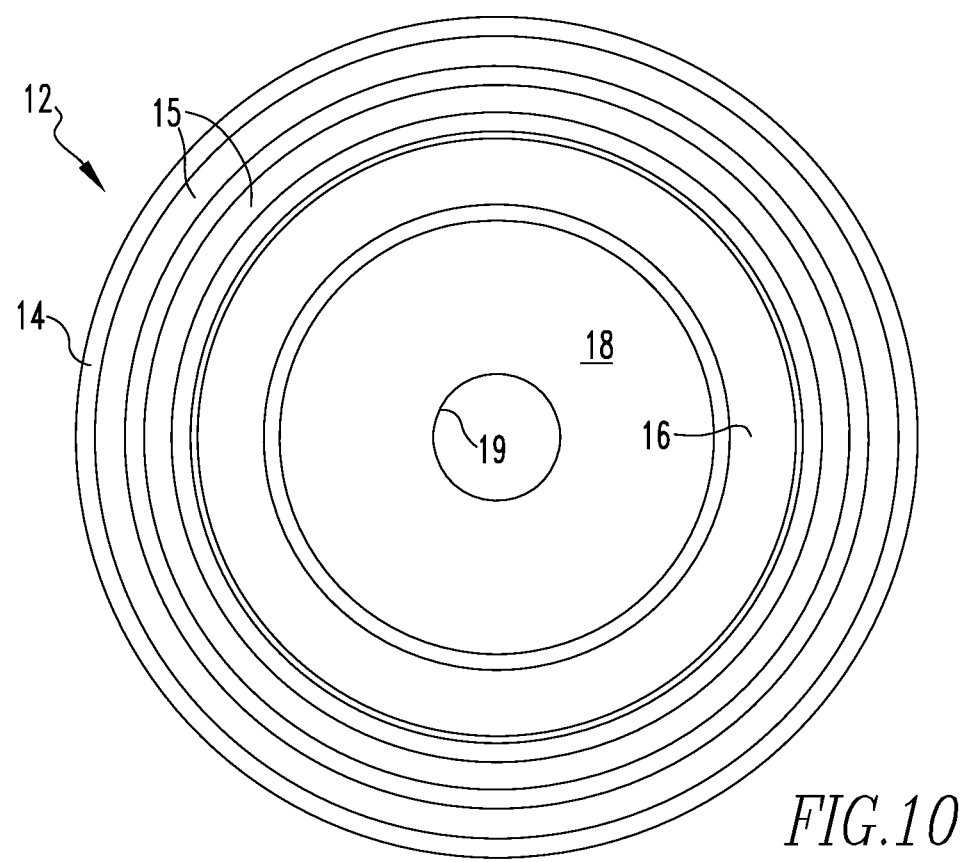
Figure 11:
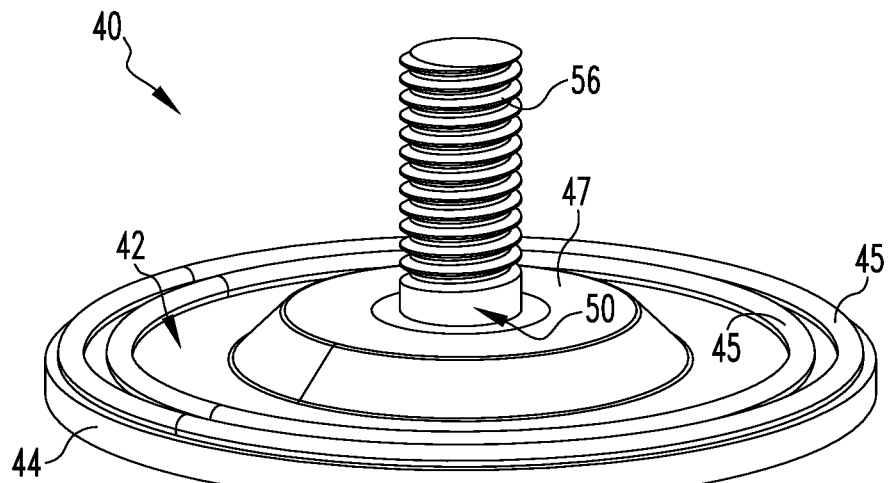
FIG. 11 is an isometric view of a suction pad that can be removably installed in the suction pad mounting assembly shown in FIGS. 1 and 2.
Figure 12:
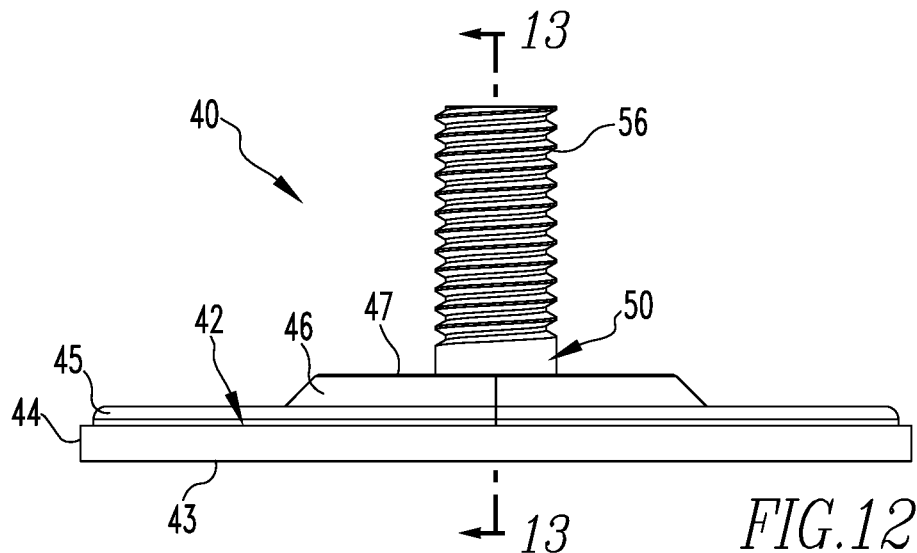
FIG. 12 is a side view of the suction pad of FIG. 11.
Figure 13:
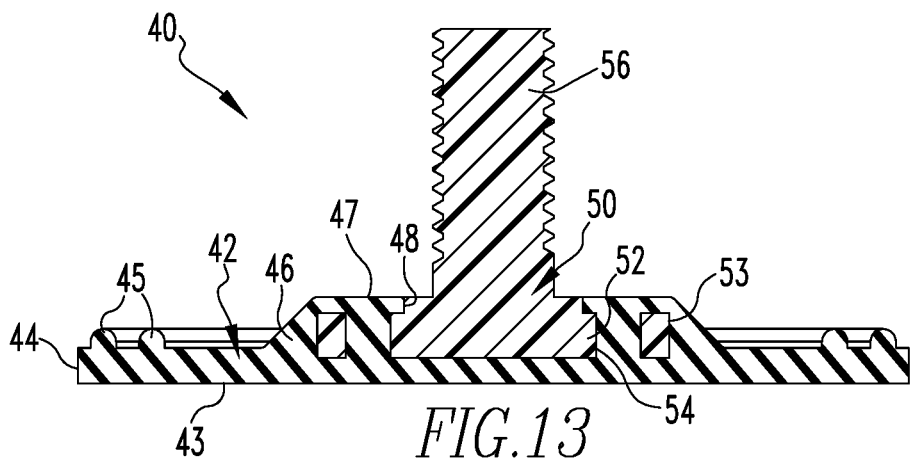
FIG. 13 is a side sectional view taken through line 13-13 of FIG. 12.
Figure 14:
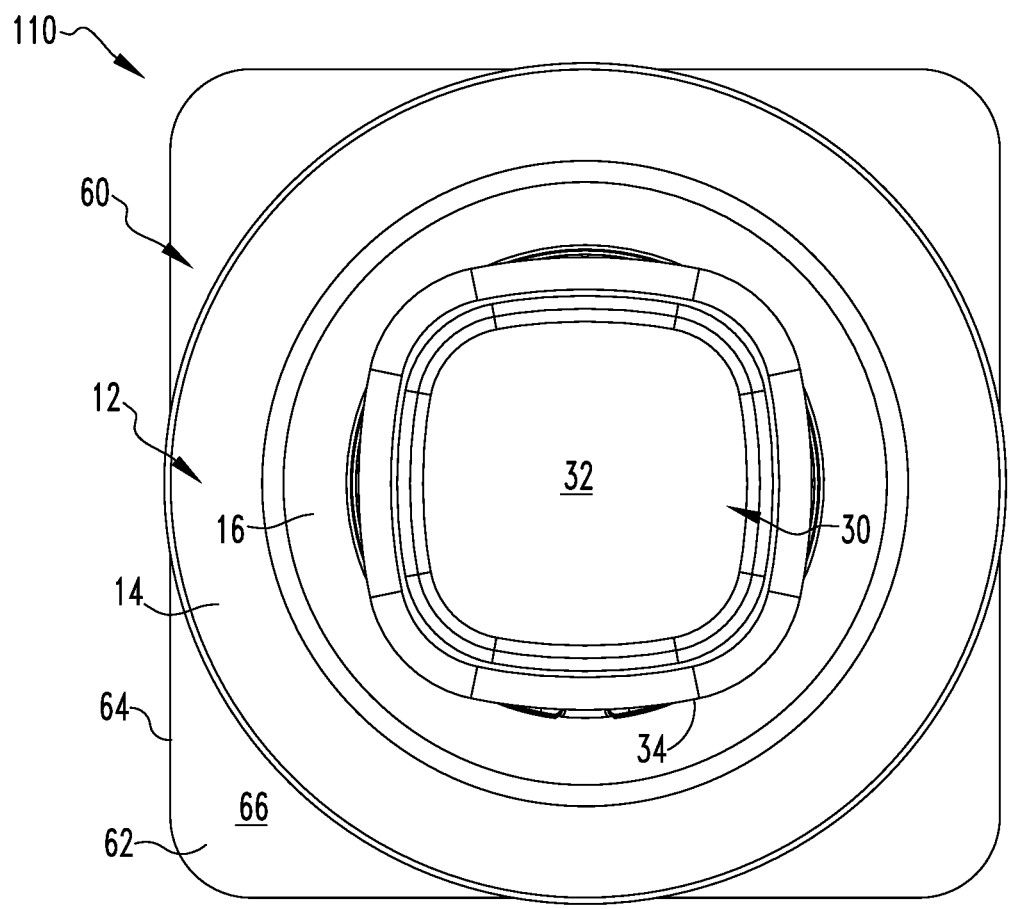
FIG. 14 is a top view of the adhesive pad mounting assembly shown in FIGS. 3 and 4.
Figure 15:
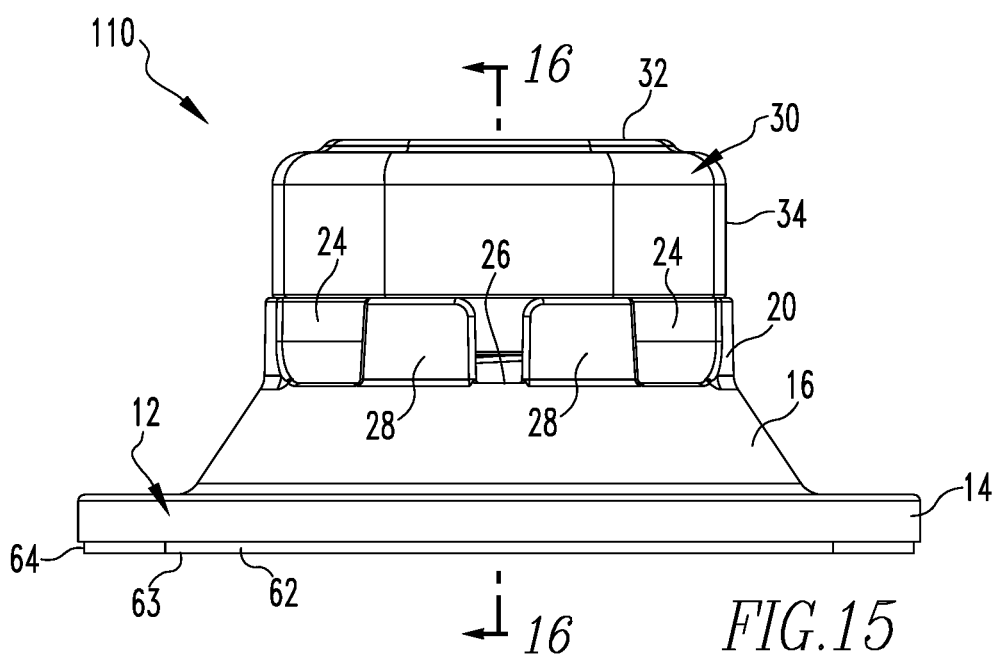
FIG. 15 is a side view of the adhesive pad assembly shown in FIGS. 3 and 4.

As shown in FIGS. 7, 8 and 11-13, the suction pad 40 includes an elastomeric suction disk 42 having a generally flat contact surface 43. The suction pad 40 includes an outer radial edge 44, a central body portion 46 and an interior face 47. As shown most clearly in FIG. 11, as well as FIGS. 7, 8, 12 and 13, the suction disk 42 includes concentric raised rings 45 on the surface opposite the contact surface 43. The concentric raised rings 45 are received within the concentric circular channels 15 of the housing 12 when the suction pad is installed on the housing 12. The suction disk 42 includes a central interior opening 48 extending through the interior face 47, as shown in FIGS. 7, 8 and 13. The suction disk 42 may be made of any suitable elastomeric material such as natural rubber, synthetic rubber, thermoplastic elastomers (TPE), thermoplastic polyurethane (TPU), thermoplastic rubber (TPR) and the like.

As shown in FIGS. 7, 8 and 11-13, a support stem 50 is secured to the suction disk 42. The support stem 50 includes a disk-shaped support flange 52 having a radial outer edge 53 and circumferentially spaced through-holes 54. The support flange 52 may be the same or similar to the support flange 72 of the embodiment shown in FIGS. 16-18, as more fully described below. The support flange 52 is contained within the central body portion 46 of the suction disk 42, and extends through the interior opening 48 in the interior face 47. In the embodiment shown, an exteriorly threaded central support post 56 extends from the disk-shaped support flange 52. The support stem 50 may be made of any suitable material including plastics such as PP, HIPS, ABS, nylon and the like.

As shown in FIGS. 7 and 8, the exteriorly threaded central support post 56 of the support stem 50 extends through the central opening 19 of the housing 12 and is threaded onto the interiorly threaded central post 36 of the handle 30. Due to contact between the contact edge 35 of the handle 30 and the edge of the outer cylindrical wall 21 and support pillars 28 of the housing 12, rotation of the handle 30 causes extension and retraction of the threaded central support post 56 of the suction pad 40. As shown in FIG. 7, in the extended position, the entire contact surface 43 of the suction disk 42 is flat. As shown in FIG. 8, when the handle 30 is turned to draw the threaded central support post 56 into the threaded central post 36, the support stem 50 pulls the suction disk 42 inward to form a recessed suction cup 49. A portion of the suction disk 42 near the outer radial edge 44 maintains contact with a bathroom wall or other surface (not shown) as the recessed suction cup 49 is formed. As long as the periphery of the contact surface 43 of the suction disk 42 remains sealed against the mounting surface, a vacuum is maintained inside the recessed suction cup 49, which securely holds the suction pad mounting assembly 10 to the surface.

In the interchangeable adhesive pad configuration shown in FIGS. 14-18, the mounting assembly 110 includes the same housing 12 and handle 30 as the suction pad mounting assembly 10 described above. The adhesive pad 60 of the mounting assembly 110 includes an adhesive contact sheet 62 having an exterior contact surface 63, peripheral edge 64 and interior face 66. In the embodiment shown, the adhesive contact sheet 62 is generally square with rounded corners that extend beyond the radial outer edge of the base flange 14. This enables a user to grasp the corners when removing the mounting assembly 110 from a wall, as well as providing a larger adhesive surface area than the base flange. Alternatively, any other shape such as round may be used for the contact sheet 62. The adhesive contact sheet may have a typical thickness of from 0.1 to 7 mm, for example, from 0.5 to 3 mm.

The adhesive contact sheet 62 may be made of any suitable materials including plastics such as polyethylene (PE), PP, polyethylene terephthalate (PET) and the like. A layer of adhesive material may be applied on the contact surface 63 of the adhesive contact sheet 62. The adhesive material may be applied over the entire contact surface 63, or a portion thereof. Suitable adhesive materials include conventional pressure-sensitive adhesives and the like. Although not shown in the figures, a conventional release film may be applied over the adhesive contact surface 63 of the contact sheet 62 prior to installation of the mounting assembly 110 by a user.

Figure 16:
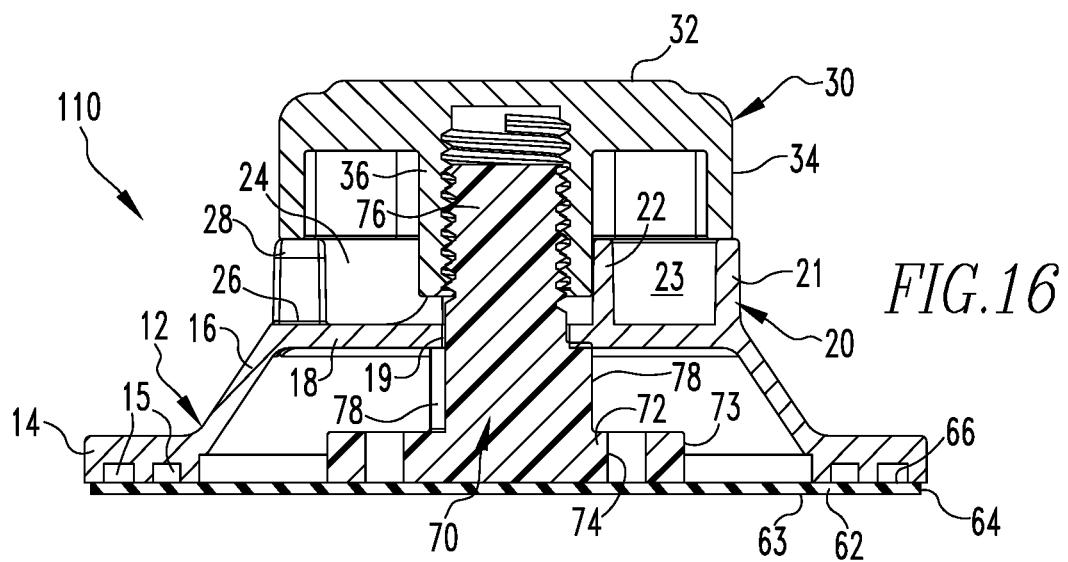
FIG. 16 is a side sectional view taken through line 16-16 of FIG. 15.
Figure 17:
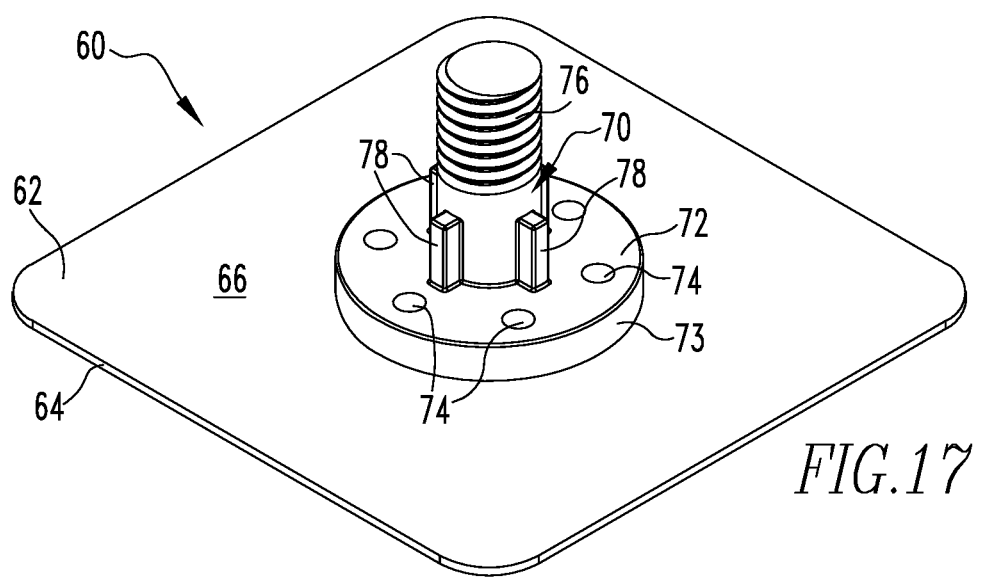
FIG. 17 is an isometric view and FIG. 18 is a side view of an adhesive pad that may be removably installed in the mounting assembly as shown in FIGS. 3 and 4.
Figure 18:
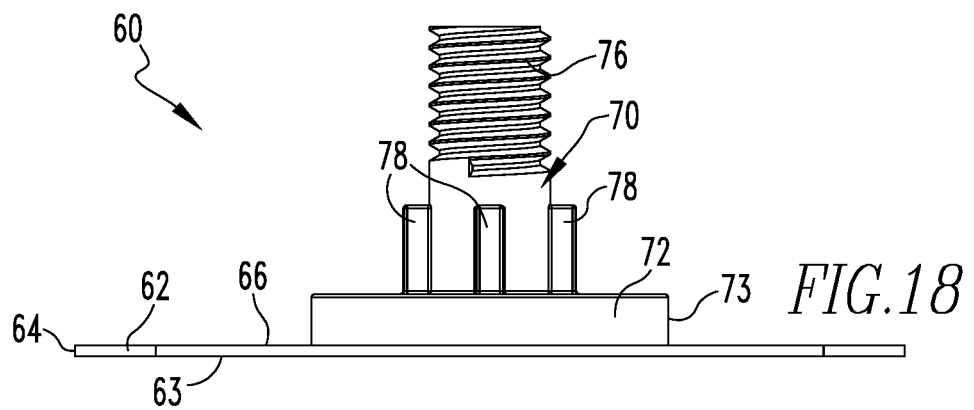

As shown in FIGS. 16-18, the adhesive pad 60 includes a support stem 70 having a disk-shaped support flange 72 attached to the interior face 66 of the adhesive contact sheet 62. Any suitable means of attaching the support flange 72 to the adhesive contact sheet 62 may be used, including permanent adhesives, ultrasonic welding, mechanical fasteners, and the like. The support flange 72 has a radial outer edge 73 and circumferentially spaced through-holes 74. An exteriorly threaded central support post 76 extends from the disk-shaped support flange 72. As shown in FIG. 16, the threaded central support post 76 of the support stem 70 is threaded into the interiorly threaded central post 36 of the handle 30. As shown in FIGS. 16-18, movement-restricting bosses 78 extend from the support flange 72 and are spaced at equal 90 degree intervals around the circumference of the central support post 76. As shown in FIG. 16, the bosses 78 may be used to prevent retraction of the central support post 76 of the support stem 70 into the threaded central post 36 of the handle 30, which could otherwise occur in the absence of the bosses 78. In this manner, when a user installs the adhesive pad 60 in the mounting assembly 110, the adhesive contact sheet 62 and its contact surface 63 are maintained in a desired flat position, and any attempted rotation of the handle 30 by a user from the flat position shown in FIG. 16 does not result in inward movement of the central support post 76. Thus, when the adhesive pad 60 is threadingly installed on the housing 12 and handle 30, the bosses 78 act as stop members to maintain the adhesive contact sheet 62 and contact surface 63 in the flat position.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A suction mounting kit comprising:
   a housing;
   a handle adjacent to the housing comprising a central post;
   a suction pad comprising a suction disk engageable with the housing and a first support stem including a first central support post engageable with the central post of the handle; and
   an adhesive pad comprising an adhesive contact sheet engageable with the housing and a second support stem including a second central support post engageable with the central post of the handle, wherein the adhesive contact sheet comprises an interior face structured and arranged to contact a base flange of the housing when the adhesive pad is installed on the housing,
   wherein the suction pad and adhesive pad are interchangeably mountable on the housing.

2. The suction mounting kit of claim 1, wherein the handle comprises a rotatable knob, the central post of the handle is threaded, the first central support post of the suction pad comprises threads that are engageable with the central post, and the second central support post of the adhesive pad comprises threads that are engageable with the central post.

3. The suction mounting kit of claim 2, wherein the threaded central post of the rotatable knob is interiorly threaded, the first threaded central support post of the suction pad is exteriorly threaded, and the second central post of the adhesive pad is exteriorly threaded.

4. The suction mounting kit of claim 2, wherein the suction disk comprises a contact surface movable from a flat position to a recessed position forming a suction cup when the rotatable knob is rotated and the first central support post of the suction pad is drawn toward the rotatable knob by a threaded engagement between the first threaded central support post of the suction pad and the threaded central post of the rotatable knob.

5. The suction mounting kit of claim 1, wherein the housing comprises a base flange including concentric circular channels facing the suction disk, and the suction disk comprises concentric raised rings removably insertable in the concentric circular channels of the base flange.

6. The suction mounting kit of claim 1, wherein the first support stem of the suction pad comprises a disk shaped support flange at least partially embedded in a central body portion of the suction disk.

7. The suction mounting kit of claim 1, wherein the suction disk comprises an elastomeric material comprising natural rubber, synthetic rubber, thermoplastic elastomers, thermoplastic polyurethane, thermoplastic rubber, or a combination thereof.

8. The suction mounting kit of claim 1, wherein the second support stem of the adhesive pad comprises a disk shaped support flange attached to an interior face of the adhesive contact sheet.

9. The suction mounting kit of claim 8, wherein the second support stem of the adhesive pad comprises at least one movement restricting boss structured and arranged to contact the housing to thereby restrict movement of the second central support post and the adhesive contact sheet when the handle is moved in relation to the housing.

10. The suction mounting kit of claim 9, wherein the at least one movement restricting boss comprises four movement restricting boss attached to the disk shaped support flange and arranged at 90° intervals around a circumference of the second support stem.

11. The suction mounting kit of claim 1, wherein the housing comprises a central opening, and the second central support post of the adhesive pad is threaded and extends through the central opening.

12. The suction mounting kit of claim 11, wherein the central opening of the housing is not threaded.

13. The suction mounting kit of claim 1, wherein the adhesive contact sheet comprises a contact surface at least partially covered by a layer of adhesive material.

14. The suction mounting kit of claim 13, wherein the layer of adhesive material fully covers the contact surface.

15. The suction mounting kit of claim 13, wherein the layer of adhesive material comprises a pressure-sensitive adhesive.

16. The suction mounting kit of claim 1, wherein the base flange comprises at least one circular channel facing the interior face of the adhesive contact sheet.

17. The suction mounting kit of claim 16, wherein the at least one circular channel comprises two circular channels.

18. The suction mounting kit of claim 1, wherein the adhesive contact sheet comprises a peripheral edge, and a portion of the peripheral edge extends radially outward from the base flange of the housing.

19. The suction mounting kit of claim 18, wherein another portion of the peripheral edge of the adhesive contact sheet extends radially inward from the base flange of the housing.

20. The suction mounting kit of claim 18, wherein the adhesive contact sheet is generally square shaped.

21. The suction mounting kit of claim 1, wherein the adhesive contact sheet has a thickness of from 0.5 to 3 mm.

22. The suction mounting kit of claim 1, wherein the adhesive contact sheet comprises polyethylene, polypropylene, polyethylene terephthalate or a combination thereof.

23. A suction mounting kit comprising:
a housing;
a handle adjacent to the housing comprising a central post;
a suction pad comprising a suction disk engageable with the housing and a first support stem including a first central support post engageable with the central post of the handle; and
an adhesive pad comprising an adhesive contact sheet engageable with the housing and a second support stem including a second central support post engageable with the central post of the handle, wherein the second support stem of the adhesive pad comprises a disk shaped support flange attached to an interior face of the adhesive contact sheet,
wherein the suction pad and adhesive pad are interchangeably mountable on the housing.

24. A suction mounting kit comprising:
a housing;
a handle adjacent to the housing comprising a central post;
a suction pad comprising a suction disk engageable with the housing and a first support stem including a first central support post engageable with the central post of the handle; and
an adhesive pad comprising an adhesive contact sheet engageable with the housing and a second support stem including a second central support post engageable with the central post of the handle, wherein the housing comprises a non-threaded central opening, and the second central support post of the adhesive pad is threaded and extends through the central opening,
wherein the suction pad and adhesive pad are interchangeably mountable on the housing.

* * * * *